Oct. 24, 1961     A. L. HUBBARD     3,005,303
CLUTCH DEVICE FOR COTTON HARVESTER

Filed Nov. 4, 1959     2 Sheets-Sheet 1

INVENTOR.
A. L. HUBBARD

ATTORNEYS

Oct. 24, 1961  A. L. HUBBARD  3,005,303
CLUTCH DEVICE FOR COTTON HARVESTER
Filed Nov. 4, 1959  2 Sheets-Sheet 2

*INVENTOR.*
A.L. HUBBARD

ATTORNEYS

United States Patent Office 3,005,303
Patented Oct. 24, 1961

3,005,303
CLUTCH DEVICE FOR COTTON HARVESTER
Arthur L. Hubbard, Des Moines, Iowa, assignor to Deere and Company, Moline, Ill., a corporation of Delaware
Filed Nov. 4, 1959, Ser. No. 850,843
11 Claims. (Cl. 56—41)

This invention relates to a cotton harvester and still more particularly relates to a device for automatically shutting off operation of the harvester should a large foreign and non-yieldable article or accumulation of articles be placed in position to contact the harvesting mechanism. More particularly, this invention relates to a safety device which will prevent injury or damage to the harvesting mechanism.

In the conventional type of cotton harvester there is normally provided a housing structure formed to define a stalk passage which receives the cotton plants as the harvester moves forwardly over a field. Positioned on one side of the plant passage is an upright drum having radially extending cotton picking spindles which extend laterally into the passage as the drum rotates for the purpose of picking the ripe cotton bolls from the plants. On the opposite side of the plant passage is an upright wall or plate which is biased to normally press the cotton plants into a position in which the cotton bolls are readily contacted by the picking spindles. The pressure plate or wall is consequently yieldable away from the passage upon a large stone, board, or other foreign article passing into the spindle. In many instances since the pressure plate is yieldable to a degree, the stone or other foreign article will be permitted to pass without damaging the spindles. However, in other instances when the article is of sufficient size, considerable damage will be done to the spindles and harvesting mechanism since it will not pass between the pressure plate and spindles.

It is therefore the primary object of the present invention to incorporate in the drive for the harvesting mechanism a clutch which will move between a drive and no-drive position for controlling the operation of the harvesting units. In combination with the clutch it is proposed to provide a control mechanism positioned in the picker housing behind the pressure plate which is responsive to the yielding of the pressure plate beyond a determined amount to automatically throw out the clutch so as to stop the harvesting mechanism. Consequently, it will be possible for a fairly large foreign item to pass between the pressure plate and spindles. However, upon it being of such size to cause damage to the spindles, the pressure plate would yield laterally sufficiently to cause the harvesting mechanism to stop. Upon the harvesting mechanism stopping, it will operate as notice to the operator to stop the harvester and to clear the obstacle from the area of the spindles.

It is still a further object of the present invention to incorporate in the drive mechanism for the harvester a clutch which may be manually thrown out at a location adjacent the spindles or picking unit. This will permit an operator to stop the operation of the mechanism in the picking units at a location adjacent the area of the units so that repair and maintenance may be had on the unit without mounting and dismounting the harvester platform each time it is desired to stop or start the mechanism.

Other objects and advantages of the invention will become apparent to those skilled in the art as the nature of the invention is better understood from the following description as shown in the accompanying drawings.

Figures 1, 4:
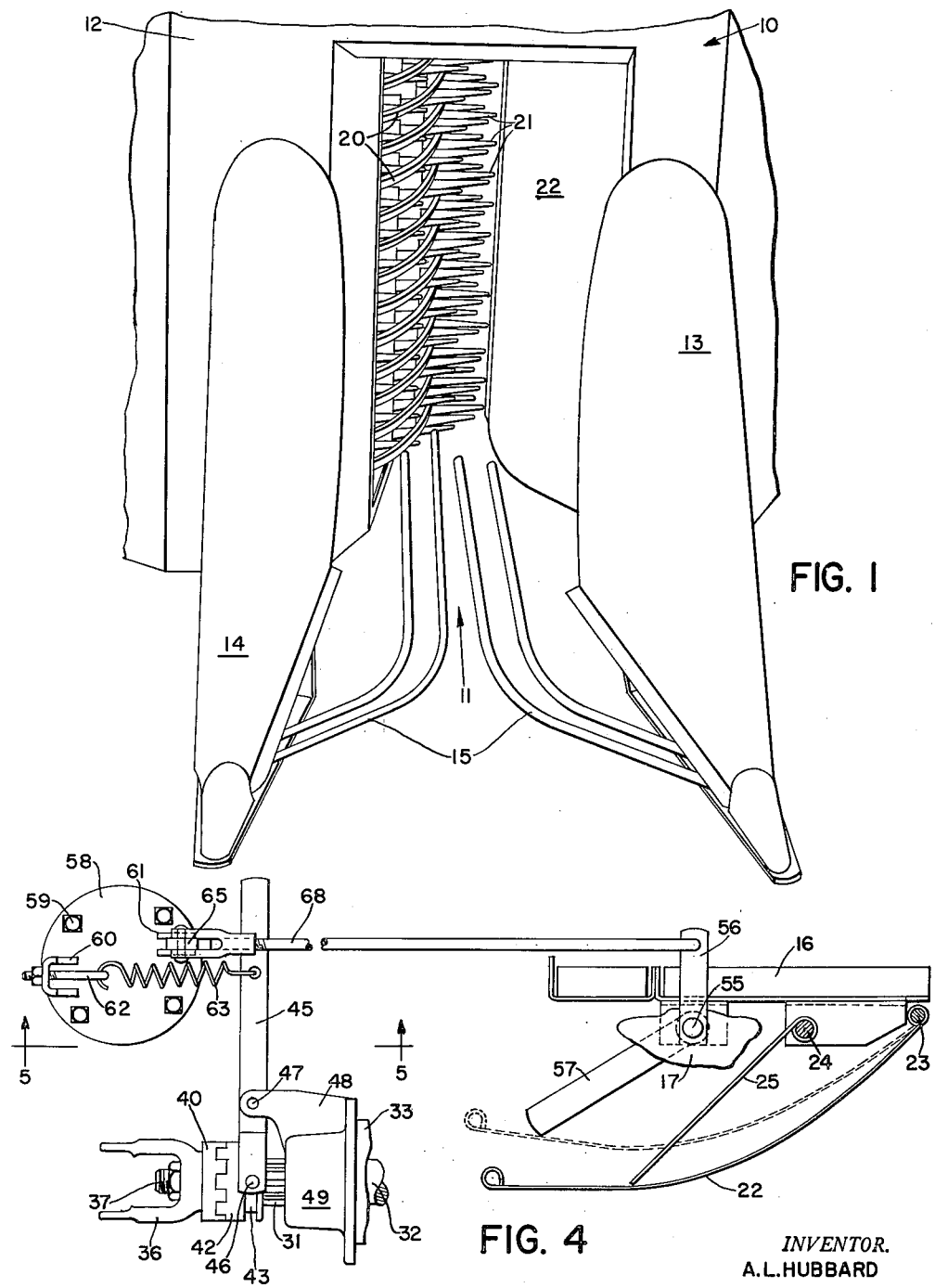
FIG. 1 is a front perspective view of a portion of the cotton harvester looking into the plant passage.
FIG. 4 is a plan view of the operating mechanism controlling the clutch with portions being broken away for purposes of clarity.

The cotton harvester herein to be described is of the type generally shown and described in detail in U.S. Patent 2,904,948 issued to A. L. Hubbard, September 22, 1959. It may be of the type which is mounted on the rear of a tractor so that the harvester will normally move forwardly as the tractor moves in a normal rearward direction; or, it may of the type which is of a self-propelled nature in which the main frame and engine source is provided as an integral part of the harvester. In either case, it should be recognized that there is required a system for raising and lowering the harvesting units and also a system of providing a power source for operating the units. Each harvesting unit is normally composed of a housing structure, here indicated in its entirety by the reference numeral 10, formed to define a fore-and-aft extending plant passage 11 through which the cotton plants move as the harvester moves forwardly over the field. The housing structure 10 includes a forwardly disposed upright wall 12 having leg portions depending on opposite sides of the passage. Stalk lifters 13, 14 extend forwardly from the front wall 12 in position on opposite sides of the passage and operate to lift fallen plants and to guide the plants into the passage 11. Further provided for purposes of guiding and otherwise aiding movement of the plants in the passage 11 are spring fingers 15 which are connected at their forward ends of the stalk lifters 13, 14 and trail rearwardly into the passage 11. Suitable framework, such as at 16, serves as part of the housing structure as well as does other panels and walls such as the overhead top plate or wall 17.

Internally of the housing structure 10 and positioned adjacent one side of the plant passage 11 is a series of vertically spaced and laterally disposed grid bars 20 through which a series of laterally moving cotton picking spindles 21 move into the plant passage 11 for the purpose of picking ripe cotton bolls from the plants. The spindles 21 are mounted on an upright picker drum, not shown, which rotates about its axis so that the spindles will move in an orbit part of which is from front to rear in the plant passage 11. On the opposite side of the plant passage 11 is an upright pressure plate or wall member 22 which is pivotally mounted on the framework 16 at its forward edge by an upright pivot pin 23 so that the rear part of the pressure plate or wall 22 may move toward or away from the spindles 21. Also supported on the framework 16 is an upright shaft 24 on which is mounted vertically spaced torsion springs 25 which normally bias the pressure plate 22 against movement away from the spindles 21. In normal operation, the shaft 24 may be adjusted so that the desired pressure by the pressure plate 22 on the plants moving in the plant passage 11 may be applied. As may be seen from viewing FIGS. 2 and 4, the arms of the torsion springs 25 engage from behind the surface of the pressure plate 22.

Figure 3:
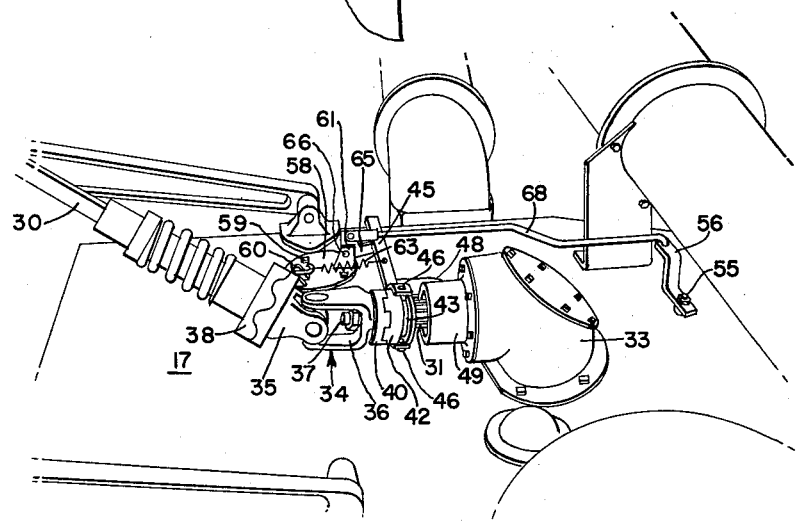
FIG. 3 is an overhead and side perspective view of a portion of the cotton harvester looking into the operating mechanism of the harvester.

Referring now to FIG. 3, there is therein shown a drive means for the harvesting unit consisting of a main drive shaft 30 driven from the power source on the tractor which is connected to a rearwardly projecting splined end 31 of a shaft 32 which extends into a bevel gear transmission, not shown, but contained in a transmission housing 33. Power is transferred to the picking drum from the beveled gear transmission and serves to operate all harvesting mechanism in the picking unit. The drive shaft 30 and splined end 31 are connected by means of a universal type joint 34 composed of a first part 35 connected to the drive shaft 30 and a second part 36 mounted on an extension 37 (FIG. 4) of the shaft 32. Generally the part 36 is permitted relative rotation on the shaft 32. A suitable overrunning clutch 38 is also provided between the drive shaft 30 and the universal joint part 35.

Integral with the hub of the universal joint part 36 is one face 40 of a jaw clutch. Carried on the splined end 31 of the shaft 32 is a second face 42 of the jaw clutch which has an outer annular slot or groove 43. A control lever 45 is provided for the clutch part or adjustable element 42 and includes a bifurcated end with parts thereof overlying and underlying respectively the annular slot 43. Pins 46 extend from the bifurcated end of the lever 45 into the annular slot 43 in the clutch jaw face 42. The lever 45 is pivotally mounted on a vertical pivot 47 which in turn is carried by a bracket 48 integrally cast with the bearing housing 49 surrounding the shaft 32. Obviously, therefore, the lever 45 is permitted lateral movement on the pivot pin 47 and is capable of moving the clutch face 42 into or out of engagement with the driving clutch face 40. When the clutch is engaged the shaft 32 is driven and in turn drives the harvesting mechanism within the cotton picker.

An upright shaft 55 is carried for rocking motion on the framework 16 and is positioned behind the pressure plate 22. The shaft 55 extends upwardly through the upper plate 17 and has an arm 56 fixed on the shaft 55 behind the yieldable pressure plate or wall 22 and has its terminal end adjacent to but spacedly from the normal position of the wall or plate 22. The normal operating position of the plate 22 and the associated arm 57 is shown in full lines in FIG. 4. It will become apparent by viewing this figure that yielding of the plate 22 beyond a position shown in dotted representation will cause the plate 22 to move the outer end of the arm 57 which in turn will result in rocking motion of the shaft 55 and the arm 56.

A circular supporting plate 58 is bolted at 59 to the upper wall or plate 17 of the housing 10 and has a pair of integral upwardly extending brackets 60, 61. The bracket 60 carries an eye bolt 62 which is connected to a forwardly extending spring 63 connected at its forward end to the lever 45. The spring 63 operates as biasing means urging the lever 45 to disengage the clutch jaws 40, 42. A bell crank 65 is pivoted at 66 to the forward bracket 61 to swing vertically. One leg of the bell crank 65 is notched at 67 to receive the lever 45 and to generally lock it against action by the spring 63 to thereby maintain the lever 45 and its associated clutch members 40, 42 in the drive position. Consequently the bell crank 65 operates as a releasable lock to maintain the clutch engaged. The bell crank 65 also has a leg extending upwardly from the pivot 66 which is connected at its upper end to a connecting rod 68. The connecting rod 68 is connected at its forward end to the control arm 56 and both of the latter form a linkage connecting the shaft 55 and bell crank or lock 65.

Figure 2:
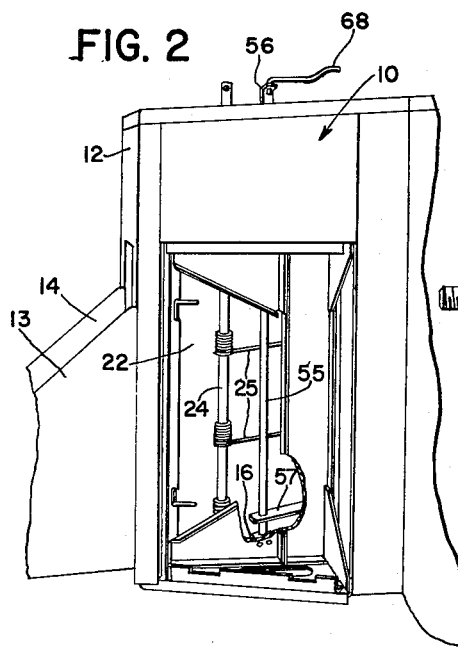
FIG. 2 is a side perspective view of the front portion of a cotton harvester with portions of the housing broken away.
Figure 5:
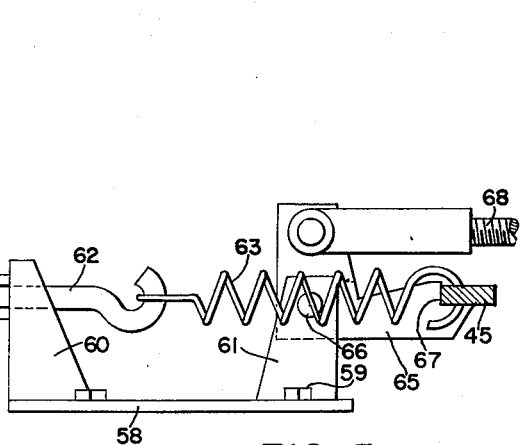
FIG. 5 is an enlarged sectional view taken substantially along the line 5—5 of FIG. 4.

In operation the invention is best utilized in the following manner. As the harvester moves forwardly over a field, in many instances the stalk lifters 13, 14 or spring fingers 15 will pick up large roots, stones, boards, or other foreign matter and will deliver the obstructions rearwardly into the harvesting mechanism. As the picking spindles 21 move in their orbit from front to rear they will contact the obstruction and force it rearwardly and toward the opposite side of the passage. In many instances the obstruction will be relatively small and the pressure plate 22 will yield sufficiently to permit passage of the obstruction through the harvester. Consequently there is a lost motion action of the plate 22 prior to its contact of the control arm 57. Generally an obstruction of such size to move the pressure plate 22 outwardly to a position shown in dotted representation in FIG. 4 is insufficient to do damage to the picking spindles. However, should a larger obstruction pass through the harvester, the picking spindles will drive the obstruction into the pressure plate 22 and will move the plate beyond that shown in dotted representation in FIG. 4 and will cause the arm 57 to rock the shaft 55 so as to draw the connecting rod 68 forwardly. Movement of the rod 68 forwardly will cause clockwise rotation of the bell crank 65 so as to move the notch 67 out of engagement with the lever 55. At this point the spring 63 will cause the lever 55 to disengage the clutch jaws 40, 42 so as to stop the drive mechanism for the harvester. The operation of the harvesting mechanism will cease and such will become apparent to the operator of the unit. The operator may manually clear the obstruction from the picking area and reset the clutch members 40, 42 manually. It should also become apparent to those skilled in the art that the clutch system described may be utilized by an operator to manually disengage the harvesting mechanism should he desire to do so on the ground level. In many instances this will be advantageous since it will be desirable to often shut down the unit for purposes of cleaning trash from the picking area or to otherwise lubricate or maintain the unit.

While only one form of the invention has been shown, it should be recognized that other forms and variations will occur to those skilled in the art without departing from the basic principles of the invention. Therefore, it should be understood that the present description was shown and described in detail for the purpose of completely and clearly illustrating the principles of the invention and was not meant to limit or narrow the invention beyond the broad concepts set forth in the appended claims.

What is claimed is:

1. A cotton harvester having housing structure defining a fore-and-aft extending plant passage; harvesting mechanism carried in the housing structure on one side of the passage and extending into the passage for harvesting cotton from the plants; an uprightly disposed pressure wall on the opposite side of the passage; means mounting the wall on the housing to permit yielding outwardly relative to the passage upon pressure being applied thereto; drive means extending to the harvesting mechanism; a clutch in the drive means effecting a drive and no-drive condition for the harvesting mechanism; an upright shaft supported in the housing behind the yieldable wall; a radial arm on the shaft adapted to contact the yieldable wall to effect rocking of the shaft upon the wall yielding a determined amount; means biasing the clutch to effect a no-drive condition; a releasable lock for maintaining the clutch in position to effect a drive condition; and linkage extending from the shaft to the lock to effect release of the lock in response to rocking of the shaft to cause said clutch to move to effect the no-drive condition upon said wall yielding beyond said determined amount.

2. A cotton harvester having housing structure defining a fore-and-aft extending plant passage; harvesting mechanism carried in the housing structure for harvesting cotton from the plants as they pass through the passage; an uprightly disposed wall adjacent the side of the passage; means mounting the wall on the housing to permit yielding outwardly relative to the passage upon pressure being applied thereto; drive means extending to the harvesting mechanism; a clutch in the drive means effecting a drive and no-drive condition for the harvesting mechanism; a rockable member supported in the housing behind the yieldable wall disposed to contact the yieldable wall to effect rocking thereof upon the wall yielding a determined amount; means biasing the clutch to effect a no-drive condition; a releasable lock for maintaining the clutch in position to effect a drive condition; and linkage extending from the rockable member to the lock to effect release of the lock in response to said wall yielding beyond said determined amount.

3. A cotton harvester having housing structure defining a fore-and-aft extending plant passage; harvesting mechanism carried in the housing structure for harvesting cotton from the plants as they pass through the passage; an uprightly disposed wall adjacent the side of the passage; means mounting the wall on the housing to permit yielding outwardly relative to the passage upon pressure being applied thereto; drive means extending to the harvesting mechanism including a clutch effecting a drive and no-drive condition for the harvesting mechanism; a rockable member supported in the housing behind the yieldable wall disposed to contact the yieldable wall to effect rocking thereof upon the wall yielding a determined amount; and linkage means connecting the rockable member to the clutch to effect the no-drive condition upon said wall yielding beyond said determined amount.

4. A cotton harvester having housing structure defining a fore-and-aft extending plant passage; harvesting mechanism carried in the housing structure for harvesting cotton from the plants as they pass through the passage; an uprightly disposed wall adjacent the side of the passage; means mounting the wall on the housing to permit yielding outwardly relative to the passage upon pressure being applied thereto; drive means extending to the harvesting mechanism including a clutch effecting a drive and no-drive condition for the harvesting mechanism; a member movably supported by the housing and responsive to the wall yielding a determined amount; and linkage means connecting the member to the clutch to effect the no-drive condition upon said wall yielding beyond said determined amount.

5. For use in a cotton harvester having housing structure defining a fore-and-aft extending stalk passage for successively receiving material as the harvester moves forwardly and harvesting mechanism in the housing structure including drive means for operating the latter, the improvement comprising: a clutch in the drive means effecting a drive and no-drive condition of the harvesting mechanism; a member disposed adjacent the passage and mounted on the housing for yielding away from the passage; means biasing the clutch to a position to effect the no-drive condition; a releasable lock for maintaining the clutch in a position to effect the drive condition; and linkage means supported on the housing and connected to the lock means to effect release of the lock in response to yielding of the member to cause said clutch to move into the position effecting the no-drive condition, the relation between the member and linkage means including a lost-motion action whereby said member may yield a predetermined amount prior to effecting the no-drive condition.

6. For use in a cotton harvester having housing structure defining a fore-and-aft extending stalk passage for successively receiving material as the harvester moves forwardly and harvesting mechanism in the housing structure including drive means for operating the latter, the improvement comprising: a clutch in the drive means effecting a drive and no-drive condition of the harvesting mechanism; a member disposed adjacent the passage and mounted on the housing for yielding away from the passage; and linkage means supported on the housing and connected to the clutch to effect in response to yielding of the member movement of said clutch to the position effecting the no-drive condition, the relation between the member and linkage means including a lost-motion action whereby said member may yield a predetermined amount prior to effecting the no-drive condition.

7. For use in a cotton harvester having housing structure defining a fore-and-aft extending stalk passage for successively receiving material as the harvester moves forwardly and harvesting mechanism in the housing structure including drive means for operating the latter, the improvement comprising: an adjustable element in the drive means effecting a drive and no-drive condition of the harvesting mechanism; a member disposed adjacent the passage and mounted on the housing for yielding away from the passage; and linkage means supported on the housing and connected to the adjustable element to effect in response to yielding of the member movement of said adjustable element to the position effecting the no-drive condition.

8. A cotton harvester having housing structure defining a fore-and-aft extending plant passage; harvesting mechanism carried in the housing structure on one side of the passage including horizontally disposed picking spindles extending into the passage for harvesting cotton from the plants; an uprightly disposed pressure wall on the opposite side of the passage; bias means mounting the wall on the housing to permit yielding outwardly relative to the passage upon pressure being applied thereto; drive means extending to the harvesting mechanism including a clutch effecting a drive and no-drive condition of the harvesting mechanism; and means responsive to yielding of the wall to cause said clutch to move into a position effecting a no-drive condition upon said wall yielding beyond a predetermined amount.

9. A cotton harvester having housing structure defining a fore-and-aft extending plant passage; harvesting mechanism carried in the housing structure on one side of the passage including horizontally disposed picking spindles extending into the passage for harvesting cotton from the plants; an uprightly disposed pressure wall on the opposite side of the passage; bias means mounting the wall on the housing to permit yielding outwardly relative to the passage upon pressure being applied thereto; drive means including a clutch operating the harvesting mechanisms; and means responsive to yielding of the wall to release the clutch.

10. The invention defined in claim 9 in which the means responsive to yielding of the wall includes a control member positioned behind the wall and normally spaced from the wall whereby the wall may yield a predetermined amount prior to the clutch being released.

11. The invention defined in claim 9 in which the spindles move horizontally from front to rear in the passage the pressure wall is mounted on the housing by means of a vertical pivot at a forward end portion and a rear portion of the wall is biased toward the spindles and is yieldable away from the passage, and the means responsive to yielding of the wall includes a control member positioned behind the rear portion of the wall and movable away from the passage upon contact with the wall.

References Cited in the file of this patent
UNITED STATES PATENTS

| | | |
|---|---|---|
| 765,584 | Lord | July 19, 1904 |
| 2,245,449 | Simpson | June 10, 1941 |
| 2,458,531 | Rust | Jan. 11, 1949 |
| 2,533,630 | Rust | Dec. 12, 1950 |
| 2,803,938 | Thomann | Aug. 27, 1957 |
| 2,815,632 | Dort | Dec. 10, 1957 |
| 2,904,948 | Hubbard | Sept. 22, 1959 |